United States Patent [19]
Potter

[11] Patent Number: 5,152,656
[45] Date of Patent: Oct. 6, 1992

[54] DUAL-PURPOSE TRAILER

[75] Inventor: George R. Potter, Eugene, Oreg.

[73] Assignee: S & G Trailer, Inc., Eugene, Oreg.

[21] Appl. No.: 644,091

[22] Filed: Jan. 22, 1991

[51] Int. Cl.⁵ .............................................. B60P 1/04
[52] U.S. Cl. ................................. 414/462; 280/414.1;
280/402; 414/563; 414/537; 414/534
[58] Field of Search ............... 280/414.1, 414.3, 402;
414/563, 532, 533, 534, 529, 462; 410/26, 29

[56] References Cited

U.S. PATENT DOCUMENTS

| | | | |
|---|---|---|---|
| 3,446,516 | 5/1969 | Modglin | 280/415 |
| 3,843,161 | 10/1974 | Hastings | 280/423 |
| 3,929,237 | 12/1975 | Schaedler | 414/563 |
| 4,274,788 | 6/1981 | Sutton | 414/462 |
| 4,406,477 | 9/1983 | McDonald | 280/414.1 |
| 4,469,346 | 9/1984 | Low | 280/414.1 |
| 4,705,289 | 11/1987 | Weber | 280/414.1 |
| 4,750,856 | 6/1988 | Lapiolahti | 280/402 X |
| 4,795,303 | 1/1989 | Bubik | 414/563 X |
| 4,880,250 | 11/1989 | Cravens et al. | 280/414.1 |
| 4,923,243 | 5/1990 | Drahos | 296/157 |
| 4,932,830 | 6/1990 | Woodburn | 414/495 |
| 4,946,332 | 8/1990 | Daniels | 414/533 X |
| 5,016,897 | 5/1991 | Kauffman | 414/563 X |

Primary Examiner—Frank E. Werner
Attorney, Agent, or Firm—Chernoff, Vilhauer, McClung & Stenzel

[57] ABSTRACT

A trailer for carrying a small boat and simultaneously carrying one end of a small automobile, so that the boat and automobile can be towed behind a motor home or other large motor vehicle without the combination of vehicles being so long as to be unduly difficult to handle. A boat support platform carries a boat with its bow forward, and a movable arch frame is pivoted about a transverse axis to raise the rear portion of the boat support frame high enough above the main frame of the trailer that the road wheels of one end of an automobile can be carried by the trailer within the space defined by the arch frame. The automobile can then be towed with the boat extending rearwardly above a portion of the automobile. When the automobile is not in position on the trailer the boat support frame is lowered to permit water launch and recovery of the boat as with a conventional boat trailer.

10 Claims, 6 Drawing Sheets

DUAL-PURPOSE TRAILER

BACKGROUND OF THE INVENTION

The present invention relates to recreational vehicles, and particularly to a trailer to be towed behind a motor home for carrying a small boat and towing a small automobile economically and from which the boat can easily be launched.

In recent years, motor homes have come into widespread use as a way to travel economically to vacation destinations. While such vehicles save the cost of hotel or motel lodging while providing a comfortable place to eat and sleep, motor homes are somewhat unhandy because of their size. It has become common, then, to tow a small automobile behind a large motor home, so that the small automobile can be used locally around a vacation destination.

In order to avoid the costs and inconveniences of boat rental, small boats are also often brought along on trips. In the past, this has sometimes been accomplished by carrying a small boat atop a motor home, which severely limits the size of boat which can be transported. Alternatively, a small boat can be fastened atop a smaller vehicle being towed, if that vehicle is large enough and the boat small enough.

Another alternative is the use of a trailer to carry both a boat and an automobile. Trailers useful in such a manner have been shown, for example, in Woodburn U.S Pat. No. 4,932,830 and McDonald U.S. Pat. No. 4,406,477, each of which depicts a trailer including a frame on which a boat may be loaded. The frame is then raised along a set of upright posts to provide room for an automobile to be driven onto the trailer to be carried beneath the boat. Such trailers are quite heavy, resulting in a substantial amount of weight which must be towed, and they are unnecessarily large for carrying small boats.

Cravens et al. U.S. Pat. No. 4,880,250 discloses a somewhat different arrangement in which a boat and boat trailer are backed onto a specially equipped trailer, after which the boat and boat trailer are raised, providing room for an automobile to be driven onto the trailer. Weber U.S. Pat. No. 4,705,289 shows another trailer in which a boat trailer and boat are carried together above an automobile carried entirely on the platform of the trailer. These are undesirably heavy trailers for towing behind a motor home.

Drahos U.S. Pat. No. 4,923,243 shows a trailer including a forward extension upon which a boat trailer carrying a boat can be carried. This also results in a larger and heavier trailer than is desirable for towing behind a motor home. Hastings U.S. Pat. No. 3,843,161 and Modglin U.S. Pat. No. 3,446,516 show other trailers equipped with elongated tongues including space for supporting boats. None of these last three mentioned patents, however, provides an economical way for a single driver to bring a small automobile and a small boat along with a motor home.

What is desired, then, is a trailer of relatively light weight, by means of which a small automobile and a boat may be towed conveniently behind a motor home, without making the combination of motor home and towed vehicles so long as to be unmanageable or unsafe, and without requiring so much power that travel is unduly slowed.

SUMMARY OF THE INVENTION

The aforementioned shortcomings of the prior art are overcome by the present invention, which provides a dual-purpose trailer of relatively light weight, which carries a small boat, such as a fishing boat equipped with an outboard motor, and permits the boat to be launched and recovered using the trailer in the same fashion as a conventional single-purpose boat trailer. The trailer of the present invention also allows one end of a small automobile to be driven onto the trailer. As a result, the automobile can be towed closely enough behind a motor home so that the combination of the motor home, trailer, and towed automobile is short enough and light enough to be handled easily when traveling on highways.

A trailer in accordance with the present invention includes a main frame supported by a pair of road wheels attached conventionally to the main frame. The main frame has a forwardly-extending tongue equipped with a conventional hitch arrangement, and supports a platform for receiving and supporting a pair of wheels of a small automobile.

In a preferred embodiment of the invention the trailer includes a centrally pivoted wheel support subassembly, equipped with a pair of pivoted ramps, up which an automobile's wheels can be driven so that the weight of one end of the automobile is then carried upon the trailer. In such a preferred embodiment of the invention the ramps are attached pivotably to the rear of the wheel support subassembly in such a way that the weight of the automobile on the trailer holds the ramps clear of the ground when the automobile is in position for towing.

Also carried upon the main frame of the trailer is a boat support frame whose front end is supported near the front of the trailer. The boat support frame is equipped with the usual keel rollers, bilge chocks and launching winch for supporting a boat adequately and facilitating launch and recovery. The rear end of the boat support frame can be raised and lowered between a lowered position for boat launching and recovering and a raised position in which the boat support frame is supported by a pair of legs spaced apart laterally far enough from each other to receive an automobile between the legs. When the legs are in an upright position they support the boat support frame with its rear end high enough to provide clearance for the towed automobile on the trailer beneath the boat support frame.

In a preferred embodiment of the invention the legs which carry the boat support frame in its raised position are interconnected with each other as an arch frame, with the lower ends of the legs of the arch attached to the main frame of the trailer. The transverse horizontal member of such an arch frame is connected with longitudinal side members of the boat support frame by a pair of slides disposed in channels defined by the longitudinal side members of the boat support frame. The boat support platform is thus supported at three spaced-apart places, giving ample lateral stability.

In a preferred embodiment of the invention a cable and winch are used to move the arch frame between its upright position and its rearwardly-extending, lowered, position. While other devices, such as hydraulic cylinder-and-piston assemblies, could be used to raise and lower the arch frame relative to the main frame of the trailer, the cable and winch assembly is preferred because of its lower cost and greater simplicity.

It is therefore a principal object of the present invention to provide an inexpensive dual-purpose trailer for carrying a boat and towing a small motor vehicle behind a motor home or other suitably powerful vehicle.

It is another important object of the present invention to provide a trailer for use in towing an automobile and also capable of launching and recovering a small boat in the same manner as a conventional boat trailer.

A further object of the present invention is to provide such a trailer which is amply strong yet lighter in weight than previously available trailers for transporting both a boat and an automobile.

It is an important feature of the present invention that it provides a trailer including a boat support frame that can be moved to a raised, forwardly-inclined position, providing room for supporting one end of an automobile beneath a boat carried on the trailer.

It is another important feature of the present invention that it provides a trailer including a boat support frame which can be moved to a position allowing the trailer to be used in the same fashion as a conventional boat trailer for launching and recovering a boat.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
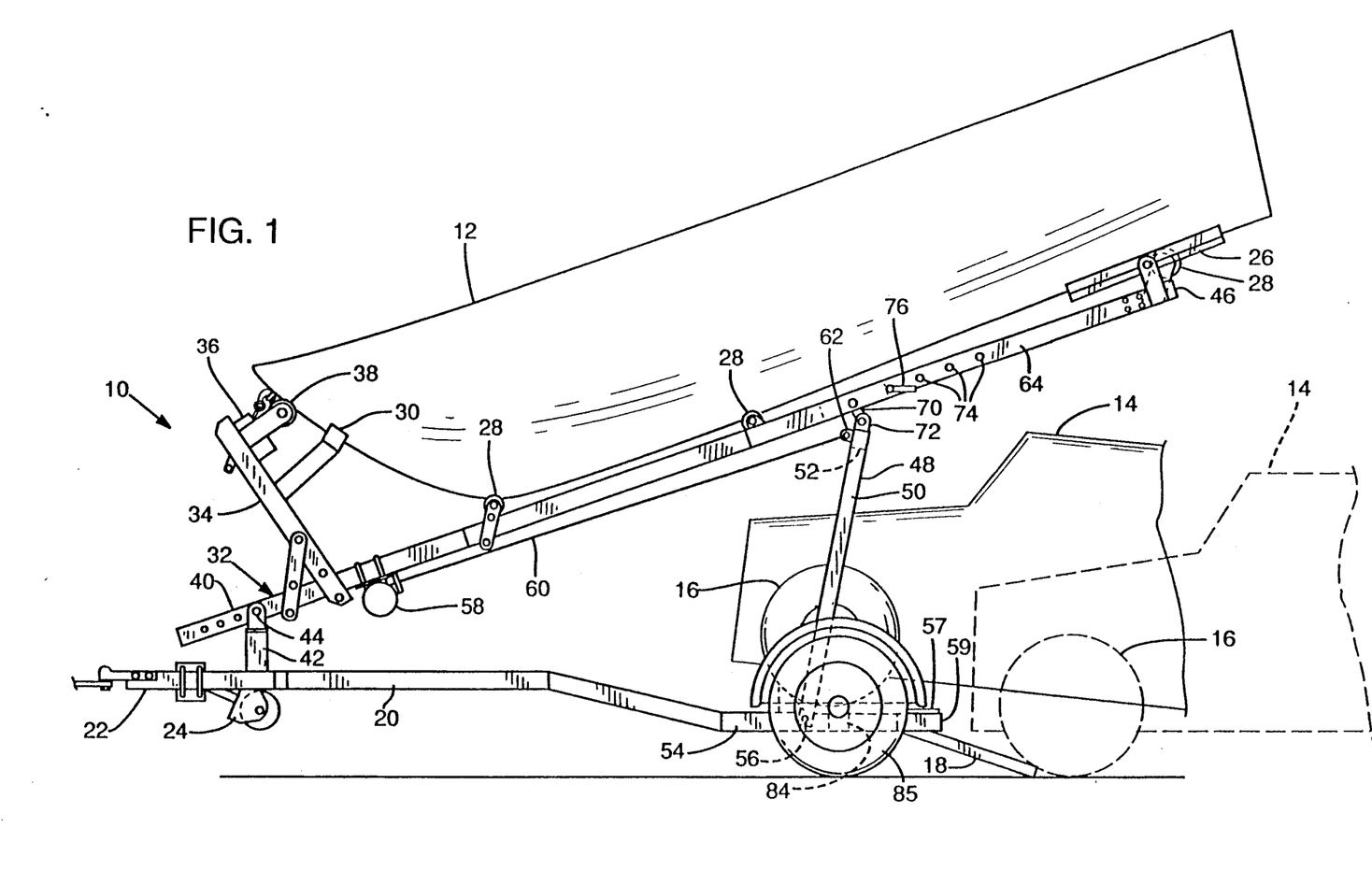
FIG. 1 is a side elevational view of a dual-purpose trailer according to the present invention, showing a boat carried on the trailer in a raised position and showing the manner in which a small automobile is placed upon the trailer to be towed.

Referring now to the drawings which form a part of the disclosure herein, in FIG. 1, a trailer 10 according to the present invention is shown with a boat 12 carried thereon. The trailer 10 is preferably constructed of steel stock such as square tubing and formed plate of suitable strength, welded together, utilizing suitable gussets for strengthening at corners and incorporating a conventional drop axle, wheels, and wheel bearings and suitable pneumatic tires to accommodate uneven road surfaces. A portion of an automobile 14 is shown with its front road wheels carried upon the trailer 10. The automobile 14 is also shown in broken line with its front road wheels 16 at the rear ends of a pair of loading ramps 18 which are part of the trailer 10, as will be explained more fully presently.

Figure 2:
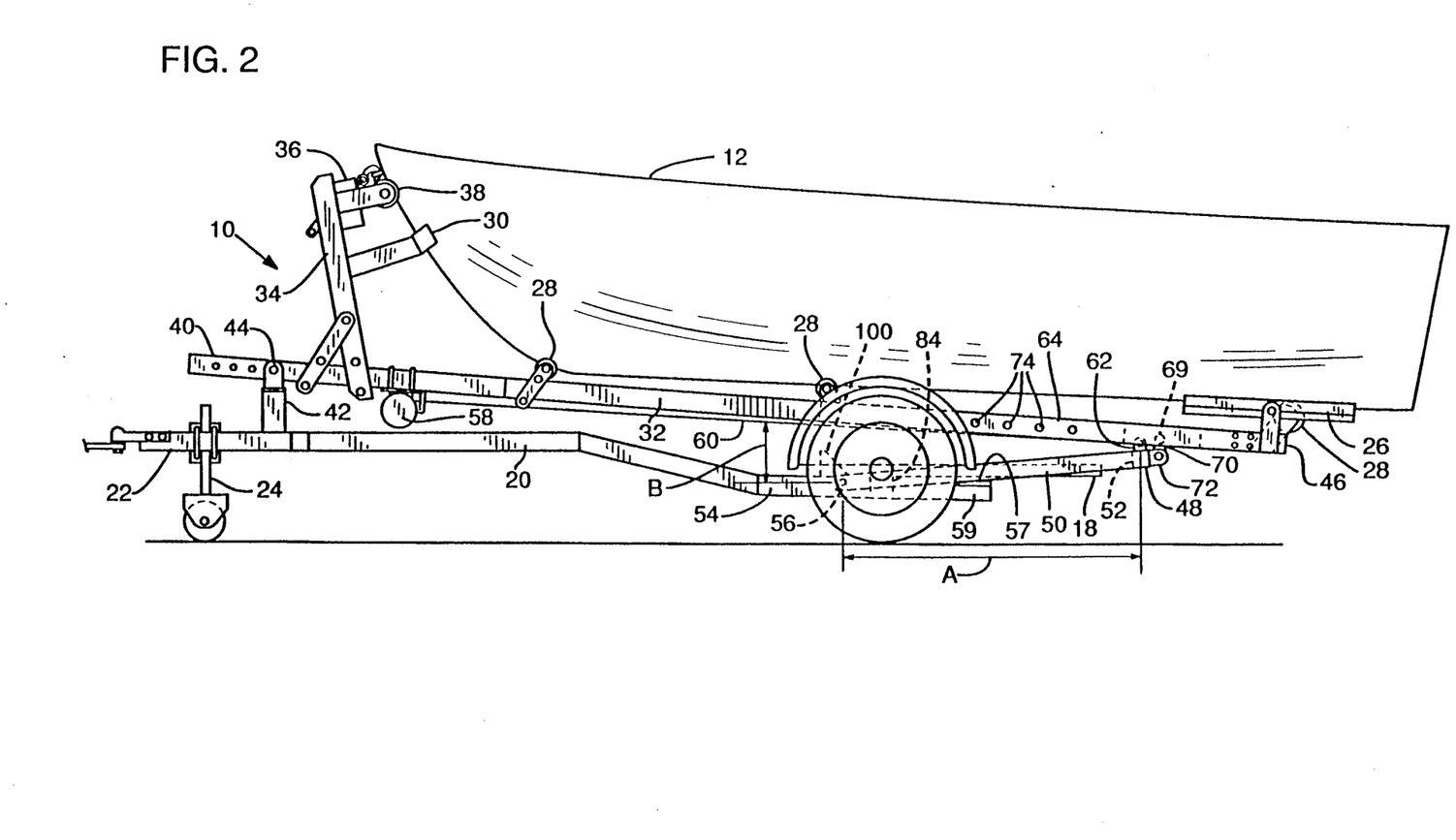
FIG. 2 is a side elevational view of the trailer shown in FIG. 1, with its boat support frame in its lowered position, in which the boat can be launched or recovered as with an ordinary boat trailer.

The trailer 10 includes a main frame 20 having a front end 22 including a tongue equipped with the usual ball-gripping hitch and a jack stand 24 for supporting the front end 22 when the trailer is not hitched to a towing vehicle. The boat 12 is supported by bilge blocks 26, keel rollers 28, and bow chock 30 such as are found on an ordinary boat trailer and which are attached to a boat support frame 32. A forward upright member 34 of the boat support frame 32 carries the bow chock 30, as well as a loading winch 36 and winch roller chock 38, which may be fastened to the upright member 34 at a selected one of several positions defined by a series of bolt holes (not shown) in a preferred embodiment of the invention. A cable wound upon the winch 36 may be used to launch and recover the boat 12 by backing the trailer 10 down a suitable inclined boat launching ramp into water deep enough to float the boat 12, when the boat support frame 32 is in its lowered position as shown in FIG. 2.

A front end 40 of the boat support frame 32 is supported above the front end 22 of the main frame 20 by an upright post 42 whose height is preferably adjustable by means such as the provision of a pin and a plurality of vertically apart-spaced holes (not shown) in telescoping inner and outer tubes. A pivot bearing 44 is provided at the upper end of the upright post 42 and provides a transverse horizontal axis of rotation for the boat support frame 32 to permit the boat support frame 32 to be pivoted about a transverse horizontal axis established by the bearing 44. The rear end 46 of the boat support frame 32 can thus be moved between the lowered position shown in FIG. 2 and the raised position shown in FIG. 1. The front end 22 of the main frame and the front end 40 of the boat support frame 32 may be adjustable in length, if desired, to accommodate boats of different lengths.

Figure 3:
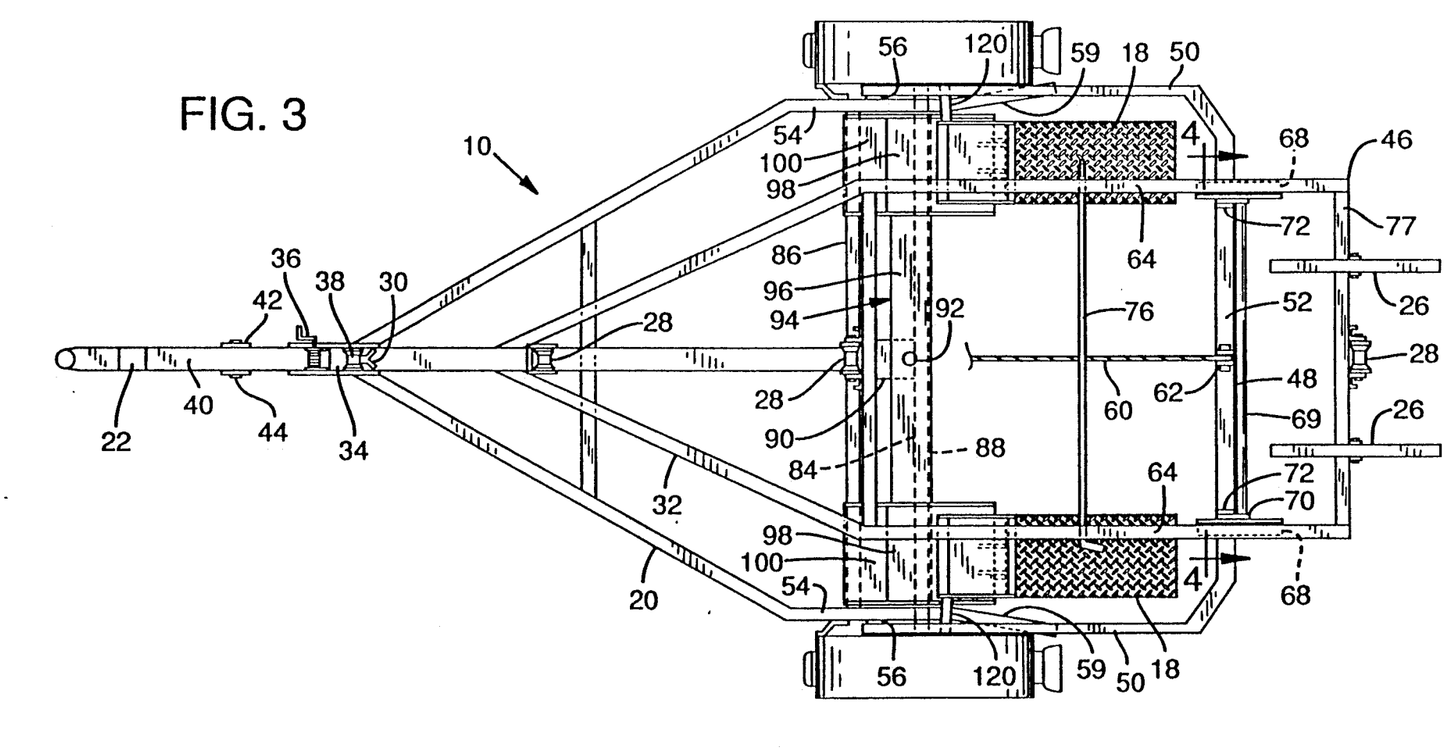
FIG. 3 is a top plan view of the trailer shown in FIGS. 1 and 2, with the boat support frame in the position shown in FIG. 2.

Referring now also to FIG. 3, an arch frame 48 includes a pair of parallel lifting legs 50 and a horizontal transverse member 52 defining the upper end of the arch frame 48. The lower end of each lifting leg 50 is attached to the outer side of a respective longitudinal side member 54 of the main frame 20 by a respective pivot bearing 56. The pivot bearings 56 establish a transverse horizontal axis about which the arch frame 48 rotates between a generally rearwardly-extending, nearly horizontal, upwardly-sloping position of the lifting legs 50, as shown in FIGS. 2 and 3, and the substantially upright raised position of the lifting legs 50, as shown in FIG. 1. In order to facilitate lifting the boat support frame 32 from its lowered position to its raised position, the bearings 56 should be placed as low as practical with respect to the main frame 20, as will be appreciated presently. Suitable rubber pads 57 may be provided atop outwardly-angled rear end extensions 59 of the side members 54 to cushion and support the lifting legs 50 when the boat support frame 32 is located in the lowered position shown in FIG. 2.

A boat-raising winch 58 is attached to the boat-support frame 32 near its front end 40, preferably by being clamped to the bottom of a central longitudinal member 59 of the boat support frame 32. A flexible tension-bearing cable 60 extends from the winch 58 to a padeye 62 located centrally on the horizontal transverse member 52. An end of the cable 60 is attached to the padeye 62 by conventional means so that winding the cable 60 upon the winch 58 raises the arch frame 48, pivoting the lifting legs 50 about the bearings 56 from the rearwardly-extending lowered position of the arch frame 48 toward its upstanding position as shown in FIG. 1.

The boat-raising winch 58 may be a manual winch in a trailer 10 designed for a small, light boat 12. An electrically powered winch with an automatic brake and ample capacity is preferred for a trailer 10 on which a larger boat is to be carried. The cable 60 must also be of suitable strength, considering the load to be encountered, which is greatest when commencing the movement from the lowered position shown in FIG. 2 to the raised position shown in FIG. 1. The tension in the cable 60 must overcome the combined weight of the rear portion of the boat support frame 32 and the boat 12, with that weight applied against the cable 60 through a mechanical advantage of the ratio of the distance A divided by the distance B, shown in FIG. 2 when commencing movement of the boat from the lowered position shown in FIG. 2. The rearward position of the arch frame 48 is limited by the pads 57 on the frame member extensions 59 to ensure that a great enough lever arm vertical component is available.

Figure 4:
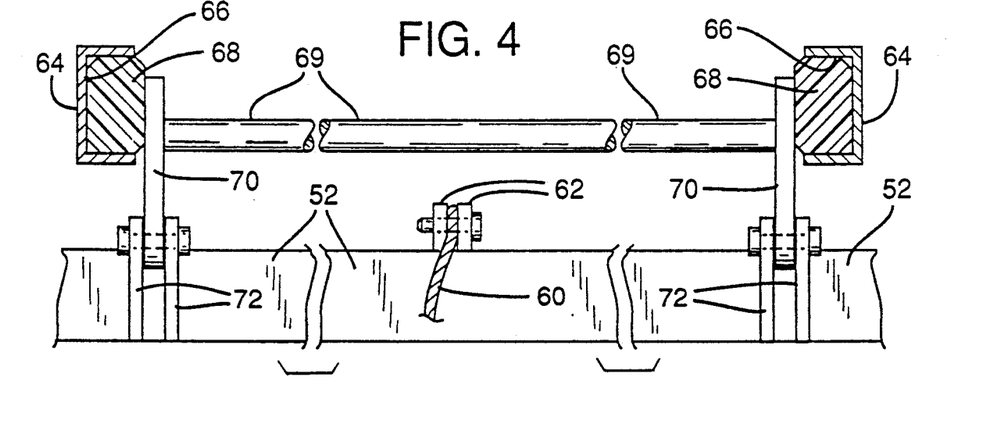
FIG. 4 is a sectional view taken along line 4—4 of FIG. 1, showing the upper end of the arch frame and the arrangement of slider members in the channels defined by the boat support frame of the dual-purpose trailer shown in FIG. 1.

As shown in greater detail in FIG. 4, the boat support frame 32 includes longitudinal side members 64 of structural metal, each defining a laterally inwardly-facing channel 66. A slider member 68, which is preferably made of a suitable low-friction plastics material, is disposed within each of the channels 66. The slider members 68 are held spaced an appropriate distance apart from each other by a transverse spacer bar assembly 69, which is pivotably connected with the transverse horizontal member 52 of the arch frame 48, as by a respective ear 70 on the spacer bar assembly 69 fitting between and attached by a pivot pin to a corresponding pair of ears 72 fixedly attached to the transverse horizontal member 52.

Each of the longitudinal side members 64 defines a plurality of locking bar holes 74 located opposite corresponding locking pin holes 74 defined by the opposite one of the side members 64. A locking bar 76 extends through both of a selected pair of such locking bar holes 74, as a stop to prevent the slider members 68 from moving rearwardly within the channels 66 when the boat support frame 32 is in the raised position, supported by the arch frame 48 in its upright position. The locking bar 76 is preferably provided with a suitable locking device such as a toggle (not shown) to prevent it from inadvertently working loose from its position in a pair of locking bar holes 74.

A transverse member 77 extends between the longitudinal side members 64 at the rear end 46, and may be attached in a selected position depending on the length of the boat 12 by use of fasteners in appropriate bolt holes 78 in the longitudinal side members 64.

Figure 5:
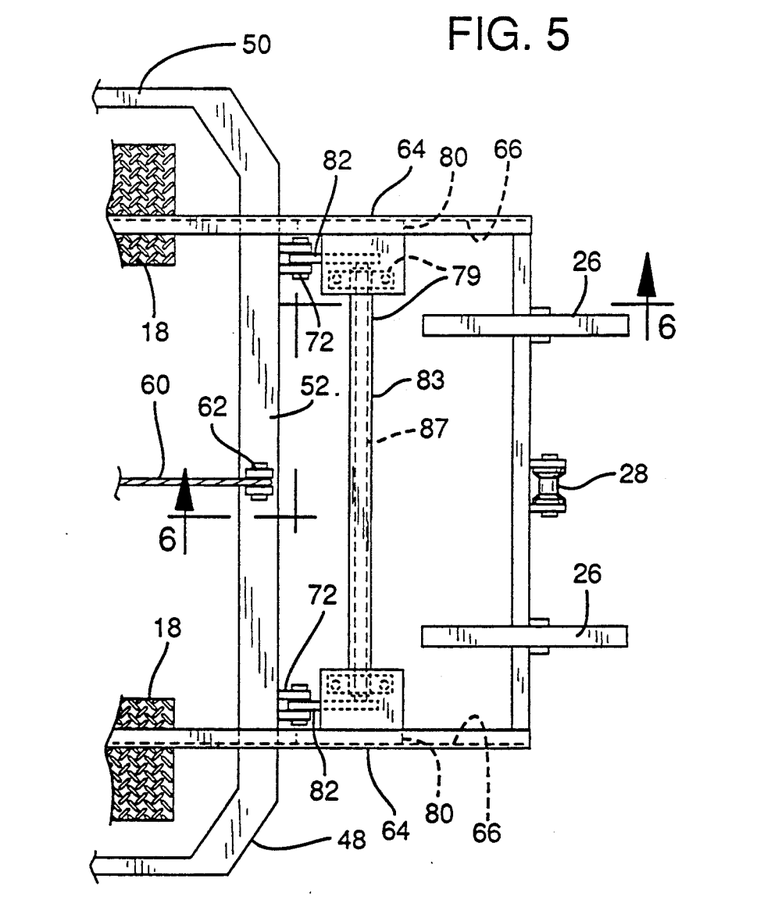
FIG. 5 is a top plan view of the rear portion of a boat trailer similar to that shown in FIG. 3 and incorporating a torsion bar suspension arrangement adapted for carrying heavier boats.
Figure 6:
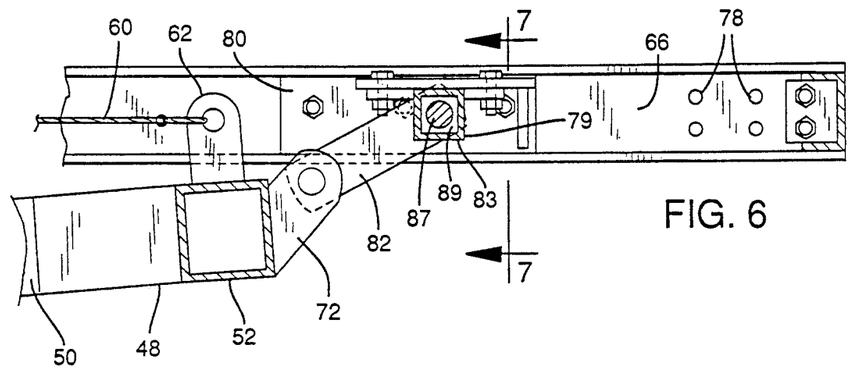
FIG. 6 is a sectional view taken along line 6—6 of FIG. 5, showing a detail of the torsion bar suspension arrangement shown in FIG. 5.
Figure 7:
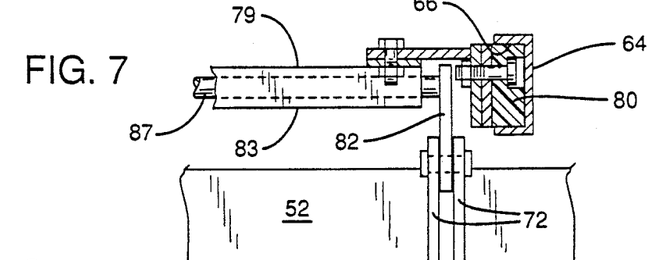
FIG. 7 is a sectional detail view taken along line 7—7 of FIG. 6.

As may be seen in FIGS. 5, 6 and 7, a slightly different slider arrangement may be provided in a trailer 10 designed for carrying a heavier boat. While the arrangement of slider members 68 as shown in FIGS. 1-4 is suitable for boats whose weight may be as great as 700 lbs, heavier boats, particularly those of fiber-reinforced plastic construction, may be more easily damaged by jolts and vibration resulting from towing the trailer 10 along uneven road surfaces. As shown in FIGS. 5 and 6, a torsion bar assembly 79 replaces the spacer bar assembly 69 and holds a pair of slider members 80, generally similar to the sliders 68, disposed in the channels 66. A pair of torsion bar levers 82 connect the torsion bar assembly 79 to the ears 72 of the transverse horizontal member 52, providing cushioning in the transfer of forces through the arch frame 48 between the main frame 20 and the boat support frame 32. Such a torsion bar assembly includes an outer tube 83 of square section shape, and an inner member 87, located within the outer tube 83 and separated from it by an elastic layer 89 of compressible material. Such a torsion bar assembly is available from Dexter Industries of Elkhart, Ind. as its 1000 lb-2500 lb Torflex ™ torsion bar axle assembly.

As may be seen best in FIGS. 3 and 5, the boat support frame 32 is substantially narrower than the main frame 20, while the arch frame 48 is slightly wider than the main frame 20, to provide room to receive one end of the automobile 14 beneath the boat support frame 32, with the wheels of the automobile 14 supported above but slightly ahead of the main axle 84 of the main frame 20. The main axle 84 is preferably a drop-center axle of conventional construction and may be equipped with suitable brakes for the wheels 85.

A main frame transverse member 86 extends between the longitudinal side members 54. A main frame rear transverse member 88, which may be the central, lower part of the main axle 84 supporting the main frame 20 and carrying the road wheels 85 of the trailer 10, extends between the longitudinal side members 54 a short distance rearwardly of the main frame transverse member 86. A central longitudinal plate 90 extends horizontally between the transverse members 86 and 88 and carries a bearing 92 defining a vertical axis of rotation. A vertical pin 93 attaches the center of a towed vehicle support assembly 94 to the main frame 20, providing the connection for transferring towing forces to the automobile 14.

Figure 8:
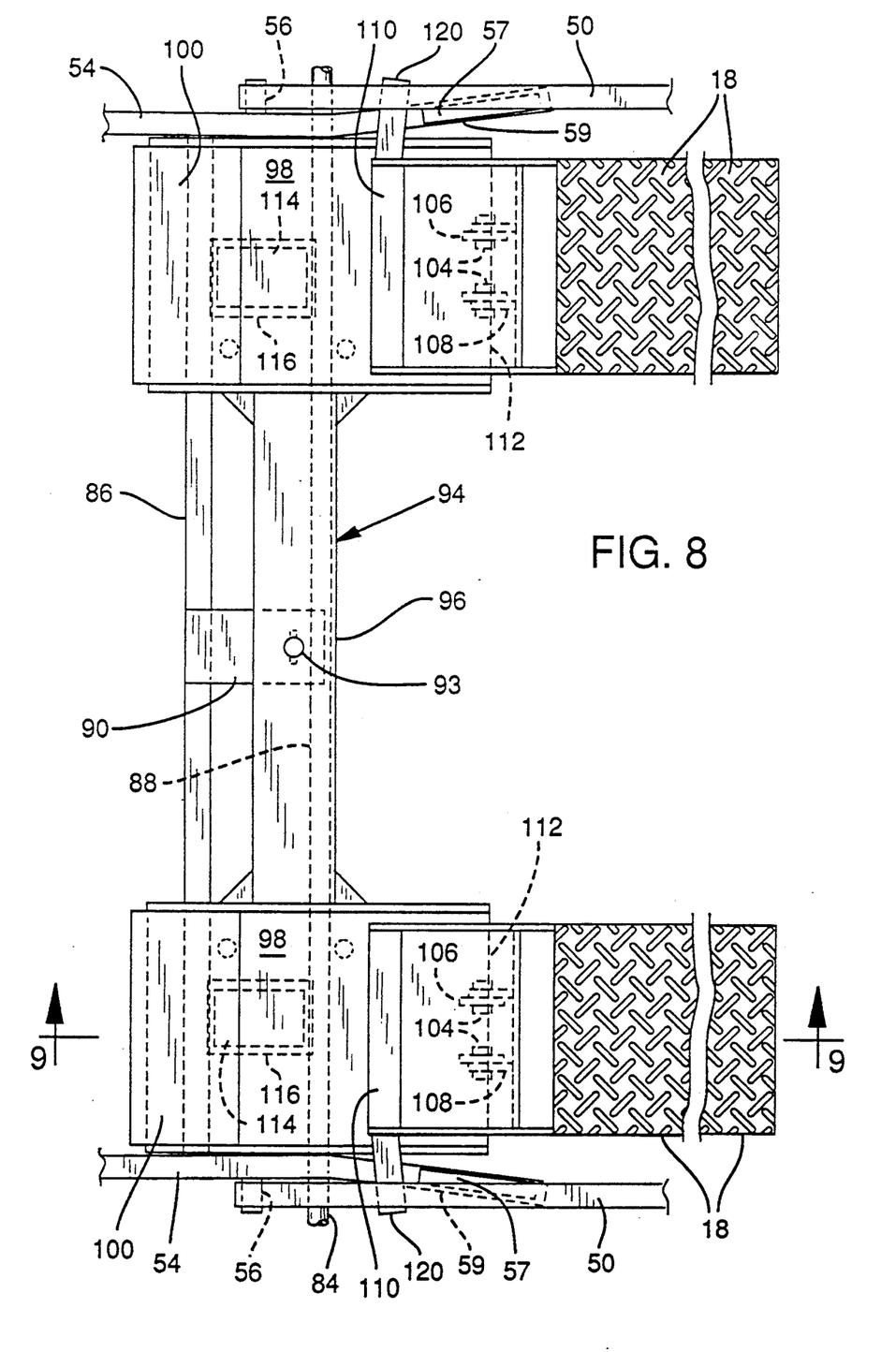
FIG. 8 is a top plan view of the wheel support subassembly and a portion of the main frame of the multipurpose trailer shown in FIG. 3, at an enlarged scale.
Figure 9:
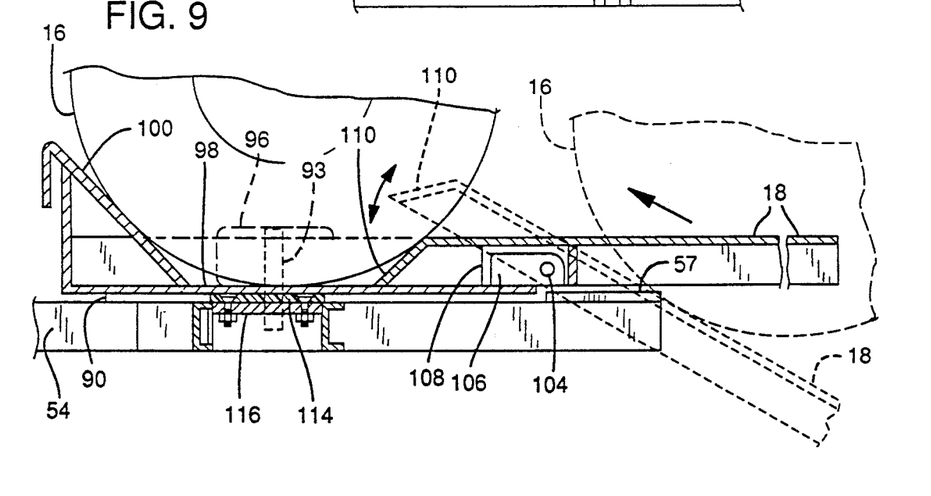
FIG. 9 is a sectional view taken along line 9—9 of FIG. 8, showing the operation of the loading ramps associated with the wheel support subassembly.

The towed vehicle support assembly 94 includes a main cross member 96 of suitable size and material such as a rectangular steel tube to carry towing forces to the bearing 92. A pair of wheel support platforms 98 are attached to the main cross member 96, as by suitable welded joints. A chock plate 100 slopes forwardly and upwardly from each wheel support platform 98 to support the front of the tire of a respective one of the front road wheels 16 of the automobile 14 and provides a place for attaching a hold-down strap (not shown) for securing the automobile 14, as may also be seen in FIGS. 8 and 9.

A loading ramp 18 is attached to the rear end of each wheel support platform 98 by suitable pivot pins 104 extending through parallel mounting ears 106 and 108 included respectively in each wheel support platform 98 and the bottom of each loading ramp 18. The forward end of each loading ramp 18 includes a forwardly-inclined chock face 110. As the wheels 16 of the automobile 14 proceed up the loading ramps 18 to a point beyond the horizontal transverse pivot axis 112 established by the pivot pins 104, the loading ramps 18 are free to rotate from the position shown in broken line to the position shown in solid line in FIG. 9. The chock faces 110, each engaging the rear portion of the tire of the respective road wheel 16, thereafter help prevent the automobile 14 from rolling rearwardly out of its desired position on the towed vehicle support assembly 94.

Longitudinal structures 116 interconnect the transverse members 86 and 88 a small distance from each side member 54 and a suitable bearing, such as a block 114 of low-friction plastic, fastened to the top of each horizontal member 116, provides the principal support for transferring vertical forces of the carried portion of the weight of the automobile 14 to the main axle member 84 for each side of the trailer 10 through the wheel support platforms 98.

A control arm 120 is attached to the front of each of the loading ramps 18 and extends laterally outward beyond the respective wheel support platform 98, so that when the arch frame 48 is lowered to its rearwardly-extending generally horizontal position, the lifting legs 50 engage the control arms 120 and push them down, raising the loading ramps 18 clear of the ground. This obviates the need for any separate fasteners to keep the loading ramps 18 from dragging on the ground.

Whenever the trailer 10 is not being used to tow an automobile 14, the boat-support frame 32 should be lowered to the position shown in FIG. 2, in order to lower the center of gravity of the trailer 10. This will raise the loading ramps 18, and the need to raise the loading ramps 18 will also act as a reminder that the boat 12 should be lowered whenever the automobile 14 is not being towed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A dual-purpose trailer, comprising:
(a) a generally horizontal main frame having forward and rearward portions;
(b) wheel means connected with said main frame for supporting said main frame;
(c) support assembly means carried on said rearward portion of said main frame for supporting a pair of road wheels of an automobile thereon and thereby attaching said automobile to said trailer in a towing position in which said automobile is only partially supported by said trailer with said road wheels located not substantially rearward of said wheels of said main frame;
(d) a boat support frame having a rear portion and a front end adjustably connected with said main frame, said boat support frame including means for carrying a boat on said trailer, and said boat support frame being attached to and pivotable about a pivot located on said forward portion of said main frame, between a lowered position in which said boat support frame is generally parallel with said main frame and a forwardly-inclined raised position in which said rear portion is higher than said front end, said lowered position facilitating use of said trailer to launch and recover a boat in water when there is no automobile in said towing position, and said forwardly-inclined raised position providing space beneath said rear portion of said boat support frame for receiving said automobile in said towing position with said pair of road wheels on said support assembly means, regardless of whether a boat is carried on said boat support frame; and
(e) means for moving said boat support frame, said means for moving said boat support frame being connected with said main frame and including a lifting leg and means for rotating said lifting leg about a horizontal axis, between a substantially horizontal position of said lifting leg wherein said boat support frame is in said lowered position, and an upstanding position of said lifting leg wherein said lifting leg supports said boat support frame in said raised position thereof.

2. The trailer of claim 1 including a pair of said lifting legs included in an arch frame which is pivotably movable about an attachment bearing which is fixed with respect to said main frame, said arch frame having an upper end, and said trailer further including slidable means for connecting said upper end of said arch frame with said boat support frame.

3. The trailer of claim 2 wherein said slidable means includes a channel defined by said boat support frame, a slider member disposed in said channel for sliding movement therealong while supporting said boat support frame, and selectively installable stop means associated with said boat support frame for retaining said slider member in a selected position along said channel.

4. The trailer of claim 2 wherein said arch frame is pivotably attached to said main frame and extends rearwardly when said lifting legs are in said substantially horizontal position, said trailer further including a winch mounted on said boat support frame and flexible tension-bearing means attached to said winch and extending to said arch frame for pulling said arch frame forward to raise said lifting legs to said upstanding position thereof.

5. The trailer of claim 1 wherein said means for moving said boat support frame includes elongate flexible tension-bearing means disposed between said boat support frame and said lifting leg for pulling said lifting leg toward said upstanding position.

6. The trailer of claim 1 including an upstanding post located proximate said forward portion of said main frame, said boat support frame having said front end thereof attached to said upstanding post by pivot means for establishing a horizontal transverse axis of rotation and for supporting said front end of said boat support frame at a predetermined height with respect to said main frame while said boat support frame is moved selectively between said lowered position and said raised position thereof.

7. The trailer of claim 6, said upstanding post including adjustable means for supporting said pivot means at a selected one of a plurality of different heights with respect to said main frame.

8. The trailer of claim 1 including means disposed between said boat support frame and said lifting leg for cushioning said boat support frame with respect to movement of said main frame in response to roughness of a road surface along which said trailer is moved.

9. The trailer of claim 1 wherein said main frame includes means for adjusting the effective length thereof in order to accommodate the length of a particular boat to be carried.

10. The trailer of claim 1 wherein said boat support frame includes means for adjusting the effective length thereof in order to accommodate the length of a particular boat to be carried.

* * * * *